Nov. 4, 1958  V. F. MATURI ET AL  2,859,122
MEAT PACKAGE
Filed Oct. 6, 1955
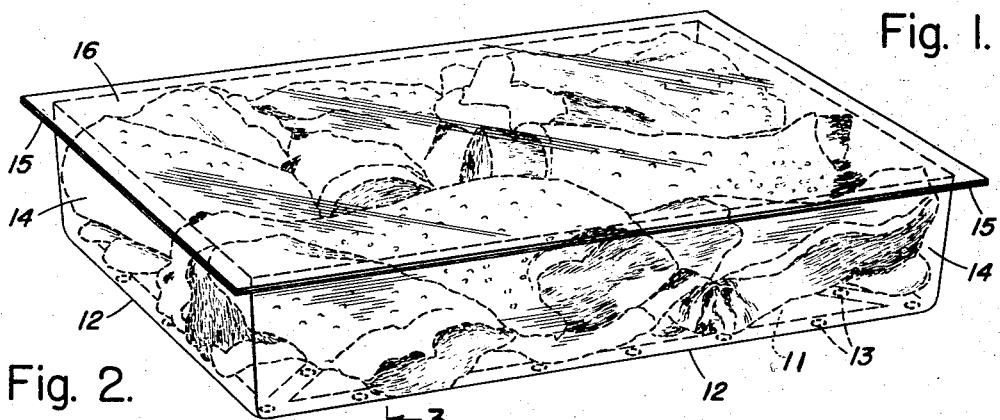
Fig. 1.
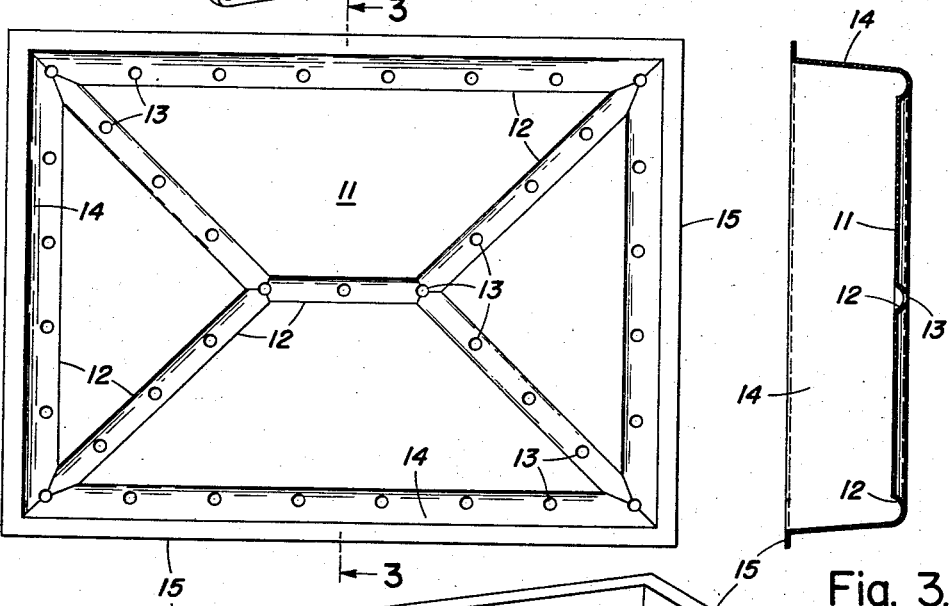
Fig. 2.
Fig. 3.
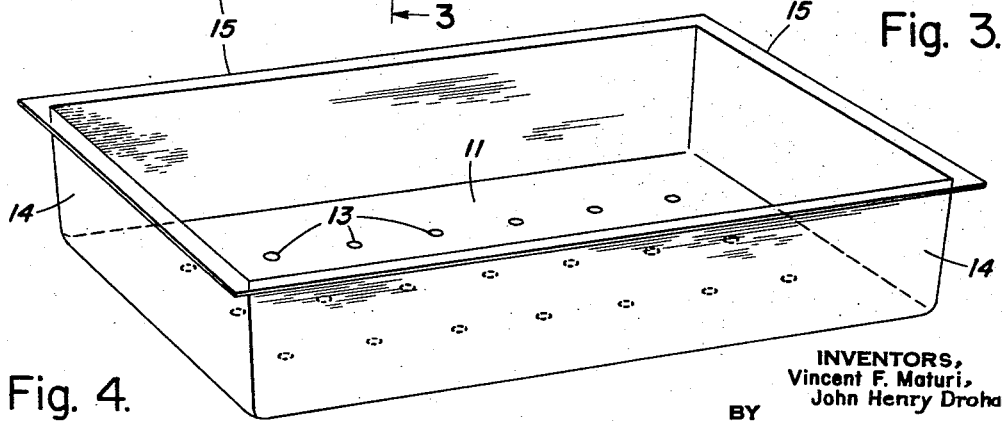
Fig. 4.
INVENTORS,
Vincent F. Maturi,
John Henry Drohan
BY
Samuel Branch Walker
ATTORNEY United States Patent Office 2,859,122
Patented Nov. 4, 1958

2,859,122

MEAT PACKAGE

Vincent F. Maturi, East Meadow, and John Henry Drohan, Huntington, N. Y., assignors to American Cyanamid Company, New York, N. Y., a corporation of Maine Application October 6, 1955, Serial No. 538,842

1 Claim. (Cl. 99—174)

This invention relates to a method of handling and packaging meat products and to packages of such meat products.

In handling meat products in the retail trade within the last few years it has become customary where possible to pre-package various cuts and portions so that the purchaser may inspect the final item on self-service counters at the point of sale, and at the same time permit centralized meat cutting where a large number of packages may be more efficiently wrapped and packaged as a continuous efficient operation. A disproportionately large amount of time is required to cut and package the meat products for individual customers at the point of sale. Also, to have a sufficiently large staff of butchers so that reasonably prompt service may be given to a fluctuating flow of trade increases labor costs, increases hand operations, and the cost of final products to the customer. It has therefore been recognized as advantageous to pre-package meat products by assembly line methods for display at self-service counters in the retail market.

As so used the term "meat products" covers the flesh of animals, poultry, fish, including liver and other organ and glandular tissues such as are ordinarily sold in the meat market. The problems are particularly pressing with poultry in which the whole or part of the carcass of birds such as chickens, turkeys, geese, ducks, pheasants, etc. is sold either as a whole carcass or cut in part. On storage these meat products release fluid from washing and or chilling operations or from internal fluids such as blood or serum. Therefore many packagers have used absorbent molded pulp trays both to support the meat product and absorb released fluids. The pulp molded tray as it absorbs juices becomes wet and soggy after a short period so that the package becomes unacceptable in appearance. Therefore, the meat product must be re-packaged in a fresh pulp molded tray after a comparatively short storage period. Depending upon the product being sold and the temperature, a molded pulp tray remains presentable from two to eight hours.

Additionally, various governmental agencies having jurisdiction insist that the meat product bear the labelled weight at the time of sale. If juices are absorbed in the tray, obviously the weight of the meat product decreases and the weight of the tray increases so that besides being visually unacceptable, the product rapidly approaches short weight and engenders punitive action by appropriate regulatory bodies.

From the standpoint of merchandizing operations, it is desirable that meat products be pre-packaged at the slaughter house or in wholesale meat markets so that labor saving devices, including gangsaws, production lines, and labor saving equipment in general, may be used to cut, trim and package at the lowest practical cost. It is desirable that the final package be formed at this time so that the retailer has only to store the final package without labor consuming packaging operations. Additionally, it is desirable that the packaged item maintain its acceptability for sale for as long a time as possible so that the retailer does not have to take a loss on over-aged items, and at the same time the final purchaser is guaranteed an acceptably fresh meat product particularly with those that sell less rapidly.

In current merchandising operations, many sales are made in self-service stores by "impulse-buying." An attractive and interesting article in a prominent location will be bought by many shoppers who did not intend to make a purchase on entering the store, but who are susceptible to suggestion in the form of a well packaged nice looking meat product.

By this invention we find that meat products which exude juices may be stored in a plastic tray which has a protective cover, and in the bottom of the tray small holes for liquids to escape. It is desirable that the tray be placed on a rack which by capillary action aids in removing the liquids from the tray; or better, be stored on an absorbent material such as a porous cardboard which will absorb the liquids exuded by or absorbed on the surface of the meat products through the holes in the bottom of the tray and thus permit the tray to appear substantially free from liquids a all times.

The trays are desirably of an exact weight so that the tare of the package is consistent and thus by weighing the final package with the tare correction the exact net weight of the meat product may be immediately ascertained.

Meat products are sold in small sizes, frequently from a few ounces to a few pounds. The weight is taken to at least an ounce, and frequently to a fraction of an ounce. If the tare of the package can vary, the package may lose the amount of the variation in many sales. It is therefore desirable that the tare weight of the packages vary less than ⅛ ounce within a lot of packages. The present trays have a variation in weight within a lot of less than ⅛ ounce. If any juices are absorbed this variation could increase. With the present trays, even after contact with released fluids, the tare weight is still within ⅛ ounce of standard.

The tray is formed of a moisture-resistant plastic material. A thermoplastic or thremosetting resin may be used in sheets or the tray may be formed by injection molding. Suitable thermoplastic resins include polyethylene, polystyrenes, vinylidienes, isobutyl resins, rubber hydrohalides, tetrafluoroethylenes, chlorofluoroalkylene polymers, vinyl resins, polyvinylbutyrals, polyvinylformals, and other polyvinylethers, methyl methacrylates, other methacrylates, cellulose esters, cellulose ethers, thermoplastic polyesters, and copolymers and mixtures of these resins. Suitable thermosetting resins include phenolformaldehydes, urea formaldehydes, melamine formaldehydes, thermosetting polyesters, isocyanates, silicone resins and other resins of similar characteristics. The resin may be used alone, or it may be used with a filler, such as fibers, wood dust, or other materials to lower the unit costs of the resin. The trays may be formed from paper, cloth or fiber sheets which are resin impregnated and molded to shape. Advertising may be incorporated on the tray, by either color printing, or by raised or depressed areas. It is particularly convenient to form the trays of a clear thermoplastic film such as polystyrene or polyethylene. Such materials are sanitary, easily formed, durable and transparent. A tray which is itself transparent is very advantageous, as the customer can see all sides of the purchased product, and be sure that defective parts are not hidden in the bottom of the tray. By using a sheet of from about 5 to 30 mils (thousandths of an inch), depending in part on the size of the tray, the tray may be sufficiently sturdy to be self-supporting and easily handled and yet sufficiently economical for single use. It is preferred that the tray be of approximately rectangular dimensions with a slight draft so that the trays may be stacked. Preferably the trays have a channeled bottom so that the juices may more readily drain, and small perforations at the points of contact between the tray and the support.

Conveniently, the tray should have a lip or a rim both for stiffness and to furnish a surface for ease of attachment of a cover.

The meat product may be covered with a thin film that is either opaque, translucent or transparent which may be microporous. Usually a transparent film is more acceptable in the retail market because it permits inspection of the meat product. By choosing a film which may be heat-sealed to the rim, the covering film may be rapidly and efficiently attached without the necessity for making provisions for juice drainage through the film as would occur if the film were wrapped completely around the meat product-containing tray. Thermosealing is particularly convenient as a method of attaching the top film, although pressure sensitive adhesives or drying adhesives or a tape may be used.

Preferably the package is stored on a liquid absorbing material, such as cardboard, and any liquids released are absorbed so that the package when lifted from its support is dry and clean and therefore acceptable by the customer. Blotting paper, or shredded material can be used to absorb the released liquids.

The top film may be printed in part with identifying symbols and advertising. The top film may be stretched over meat products that extend upward from the tray, such as whole chickens, etc., but more conveniently the meat products are cut up, and filled into the tray so that the top film is flat. This allows the filled trays to be arranged in layers, a layer of absorbent paper placed thereon, and then another layer of trays, so that a large number of trays can be packed in a box for shipment, and conveniently stored and inventoried. A firm top film, as a fairly thick sheet may be used for strength if deep layers of trays are to be transported. Obviously, the meat product in the trays may be frozen during part or all of the storage period.

The storage life of meat products may be extended by contacting at least the surface of the meat product with a small portion of an antibacterially effective form of an antibiotic. Various antibiotics may be used to extend the storage life of meat products. An article by Tarr et al. in Food Technology, May 1954, page 19, and an article in Food Technology for September 1952, page 363, show that antibiotics will extend storage life. Examples of such antibiotics are chloramphenicol, neomycin, polymyxin, anisomycin, puromycin, penicillin, tyrothricin, actidione and the tetracyclines. The tetracycline group antibiotics, including therapeutically effective forms of tetracycline, chlortetracycline, bromotetraylcine and oxytetracycline, such as the hydrochloride, the sulfate, the free base, alone or in admixture with other antibiotics are particularly effective. A group of patents to Jensen and Sherman, 2,550,253 to 2,550,269 show a group of antibiotics which are particularly suitable for food preservation. The antibiotics for meat product preservative must be non-toxic to human, at least after the meat product is prepared for serving, but the antibiotics need not be suitable for therapeutic usage in humans. Frequently mixtures of antibiotics are particularly effective. For instance a mixture of neomycin and polymixin is very useful.

The method of contact of the antibiotic with the meat product may be by any convenient procedure, as for example by spraying or dipping.

With many meat products, particularly poultry, the poultry is slaughtered, picked and then chiled. The chilling frequently is accomplished by immersing the poultry in an ice slush which may contain the antibiotic. After the poultry has been permitted to remain in the slush until chilled, and until convenient to accomplish the next step, the poultry may be removed from the slush and packaged. It is convenient to place the eviscerated poultry on hooks on a conveyor and cut them up one part at a time. A group of trays may move parallel with the first conveyor. Each operator cuts off selected portions of the poultry and places them in the tray. In such fashion an assembly line may be used which most conveniently accomplishes the cutting up and packing of the poultry. It is convenient if desired, to spray the packaged poultry with an antibiotic containing solution and permit the excess to drain free. Obviously, the present sanitary standards practiced in a field should be used to insure that a minimum of contamination occurs in order that the bacteria which must be inactivated by the action of the antibiotic are at a minimum.

More specifically, our invention is illustrated in the accompanying figures:

Figure 1 shows a chicken in a polystyrene tray.

Figure 2 shows an individual tray having corrugations in the bottom.

Figure 3 shows a section on line 3—3 of Figure 2.

Figure 4 shows an individual tray having a plurality of perforations in the bottom.

Figure 1 shows a tray for chickens which is formed by vacuum molding a ten mil sheet of polystyrene. A suitable shape mold is chosen, a sheet of polystyrene placed thereover and drawn against the mold by vacuum. The mold is heated until the sheet assumes a desired form after which the sheet is chilled, the edge is trimmed, and holes punched into the bottom, although other methods of forming the holes may be used. The tray consists of a bottom 11 in which are molded corrugations 12. The corrugations extend around the periphery and from the corners diagonally towards the center. A plurality of holes 13 are formed spaced along the corrugations. The walls 14 which are continuous from the edge of the bottom are topped by a continuous flange 15. For purpose of convenience a taper of about 1/8 inch from the bottom to the top of the wall may be used to permit stacking of empty trays. Obviously, other sizes and directions of corrugations may be used.

A convenient size for chickens is a tray that is about 6 inches by 8 inches external dimensions with a 1/8 inch flange, 3/16 inch corrugations in the bottom, and with 1/16 inch holes. The total depth of the tray is about 1½ inches. Obviously these dimensions vary for trays for different size poultry and may vary even more for other types of meat products, such as steaks, chops, roasts, etc. As shown in Figure 1 a transparent film 16 of polyethylene is laid over the chicken and heat-sealed to the edges of the tray.

The chicken after evisceration is chilled for 2 hours in an aqueous solution containing 10 milligram per liter of tetracycline hydrochloride, and solid ice particles, and then the chicken is cut in pieces for cooking, and put in the tray. The film is placed over the chicken, and heat-sealed in position. The packaged chicken was found to be storage stable and to maintain customer acceptability for over a week when stored under refrigerator conditions between 34° F. and 40° F.

Figure 4 shows a tray with a flat bottom having in the bottom twenty-one 1/8 inch holes for drainage of the juices.

Obviously a wide variety of laminates and sizes may be used depending upon the meat product to be packaged, and the moisture-proof material economically available. Other modifications of our invention are within the scope of the appendant claim.

We claim:

A process for maintaining meat products in a substantially released fluid-free weighed merchandisable condition which comprises filling a plurality of open-top moisture resistant trays of plastic material having a bottom and upstanding sides, integrally formed reinforcing corrugations in the bottom thereof and holes in the bottom of said corrugations, and of uniform tare with a fluid-releasing meat product, sealing moisture resistant transparent covers over said meat product containing trays, said covers having a uniform tare, placing the filled trays on a liquid absorbing material during storage, removing fluids from the trays as they are released by said meat product by absorbing said fluids on said liquid absorbing material, and determining the net weight of the meat products in each tray from time to time by subtracting the uniform tare from the gross weight of the meat product containing tray.

References Cited in the file of this patent

UNITED STATES PATENTS

| | | |
|---|---|---|
| 1,404,154 | Lee | Jan. 17, 1922 |
| 2,010,121 | Wesley | Aug. 6, 1935 |
| 2,452,174 | Arnold | Oct. 26, 1948 |
| 2,736,656 | Marshall | Feb. 28, 1956 |
| 2,733,624 | Knieriem et al. | Dec. 11, 1956 |

OTHER REFERENCES

"Food Technology," September 1952, pp. 363 to 366, inclusive; article entitled "Experimental Preservation of Flesh Foods with Antibiotics."

"Chemical and Engineering News," September 28, 1953, page 3960, article entitled "Antibiotics in Meat Processing."

"Food Engineering," September 1953, pp. 186 and 187, article entitled, "Vented Wrap for Poultry."

"Refrigerating Engineering," February 1954, pp. 45 to 48, inclusive, article entitled "Protective Packaging of Frozen Foods."